United States Patent [19]

Gasparrini

[11] 4,096,374
[45] Jun. 20, 1978

[54] METHOD OF JOINING SURFACES USING A BALL WELDABLE MATERIAL

[75] Inventor: C. Robert Gasparrini, Rye, N.Y.

[73] Assignee: Baldwin-Gegenheimer Corporation, Stamford, Conn.

[21] Appl. No.: 794,992

[22] Filed: May 9, 1977

[51] Int. Cl.² ............................................. B23K 19/00
[52] U.S. Cl. ....................................................... 219/94
[58] Field of Search ..................................... 219/93, 94

[56] References Cited
U.S. PATENT DOCUMENTS 1,278,357  9/1918  Lachman .............................. 219/94
1,330,241  2/1920  Cutter .................................. 219/94

Primary Examiner—Arthur T. Grimley
Assistant Examiner—J. H. Bouchard

[57] ABSTRACT

The invention relates to a method of joining at least two layers of material one of which is made of weldable material. At least one of the layers of material has an opening therein for receiving a ball of weldable material so that the ball rests in contact with the layer of weldable material. The diameter of the hole is in the range of 94% to 96% the diameter of the ball. The diameter of the ball is in the range of 2T to 5T where T is the thickness of the layer of material having the opening therein. Heat and pressure are applied in sufficient amounts and for a sufficient time to weld the ball to the layer of weldable material. The ball is deformed so that it overlaps the other layer in part so as to attach the two layers.

4 Claims, 4 Drawing Figures

METHOD OF JOINING SURFACES USING A BALL WELDABLE MATERIAL

BACKGROUND OF THE INVENTION

This invention relates to a method of joining or attaching two surfaces or layers of material and more particularly to a method of welding two surfaces or layers of material in an efficient, time saving and effective manner.

There are known in the prior art a variety of different ways and procedures for joining two layers of material such as by welding. Sometimes this is accomplished by a procedure called spot welding. In spot welding there are at least two layers of material in face-to-face relation. The layers are made of weldable material. At selected points there are applications of electrical current and pressure to cause welding of the layers at the selected points.

In conventional spot welding two layers of material are placed in face-to-face relationship. Electrodes are placed on opposite sides of the layers in alignment with one another and electrical current passed through the electrodes. This technique has several disadvantages which can limit its effectiveness. For example, where a series of spot welds are used to join together layers of material, the current will be split. In other words, a certain amount of current will go directly between the electrodes while some of the current will be shunted to adjacent spot welds. This produces a random variable amount of current available for the new weld depending upon the relative resistance of previously made adjacent welds and the contact resistance of the electrode and layers of material at the point where the new weld will be formed.

Where the layers of material or at least one layer is either non-weldable or difficult to weld a technique sometimes referred to as plug welding is used.

In the plug welding technique, a plug which may be cylindrical or even washer shaped, is formed of weldable material. An opening or hole is formed in the upper layer of material which is not necessarily weldable and the plug placed therein so that it is in contact with the lower layer of material. The problems of current shunting can also occur with this technique and in some techniques using a dielectric coating.

Another technique for joining spaced apart weldable materials involves forming a sandwich like construction. The outer layers of the sandwich must, in this case, be formed of weldable materials. The inner part of the sandwich consists of a dielectric sheet or plate such as Teflon and has weldable balls to join the outer layers of the sandwich. This method of attachment is effective where the layers to be joined are in spaced relationship and where both layers of material are made of weldable material.

OBJECTS

With the foregoing in mind, it is an object of this invention to provide a new and improved method of joining two layers of materials only one of which is made of weldable material.

Another object of this invention is to provide a method of welding layers of material without shunting of electrical current to adjacent welds.

Another object of this invention is to provide a method of joining at least two layers of materials one of which is of weldable material wherein the layers are, at least in part, in face-to-face relationship and wherein a weldable ball is placed in an opening of one of said layers and in contact with the layer of weldable material so that upon application of heat and pressure in sufficient amounts the layers will be joined by the ball.

A still further object of this invention is to provide a method of joining layers of material at a plurality of locations.

A further object of this invention is to provide a method of joining at least two layers of material wherein one of said layers has an opening therein for receipt of a ball of weldable material the ball having dimensions related to the dimensions of the layer having the opening and to the size of the opening which provides new and unexpected results.

Additional objects and advantages of the invention will be set forth in the description which follows and in part will be obvious from the description. The objects and advantages being realized and obtained by means of the procedures, steps and methods being particularly pointed out in the appended claims.

BRIEF DESCRIPTION OF THE INVENTION

Briefly described, the invention relates to a method of joining two layers of material by welding.

More particularly the invention relates to a method of welding at least two layers of material at least one of which is made of weldable material using a ball of weldable material. The upper layer of material is provided with an aperture or opening of a particular size to receive the ball so that the ball may rest on the bottom layer of material without touching the upper layer of material. The weldable ball has a diameter which is related to the thickness of the layer having the opening and to the size of the opening itself.

The ball is made of some convenient material which is weldable with respect to the bottom layer of material. The upper layer of material can be made of any material weldable or non-weldable and need only be capable of withstanding the temperatures and pressures involved in the welding process.

After the ball has been placed in the aperture electrodes are placed in contact with the ball and the adjacent portion of the bottom of the layer of material on which the ball rests. Electrical current is then passed through the electrodes, and pressure applied in the usual manner used in welding, so that the ball is welded to the bottom layer and overlies a portion of the upper layer so as to join the upper and lower layers.

The invention consists of the novel parts, steps, procedures and improvements shown and described.

The accompanying drawings which are incorporated in and constitute part of this specification illustrate an embodiment of the invention and together with the description serve to explain the principles of the invention.

DETAILED DESCRIPTION OF THE INVENTION

Figure 1:
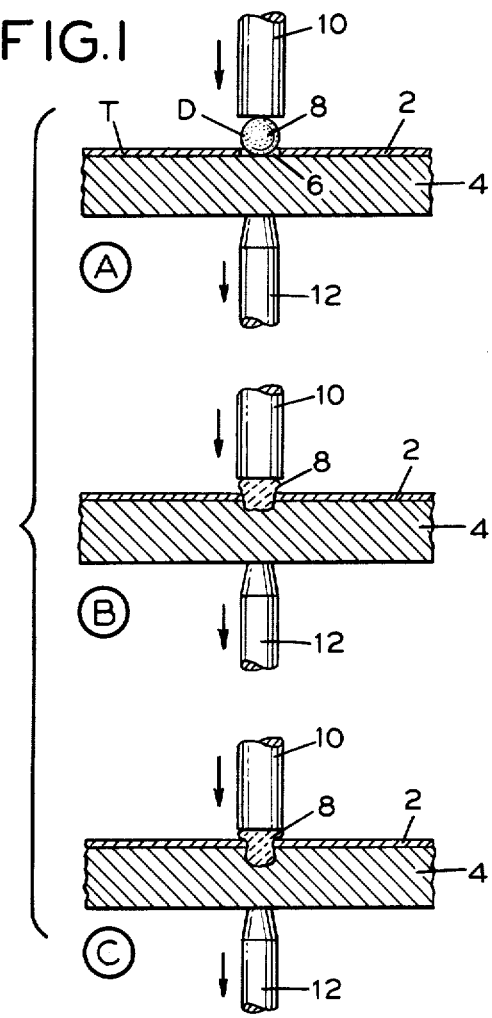
FIG. 1 is a schematic cross sectional view showing the process of the invention in three stages designated A, B and C.
Figure 2:
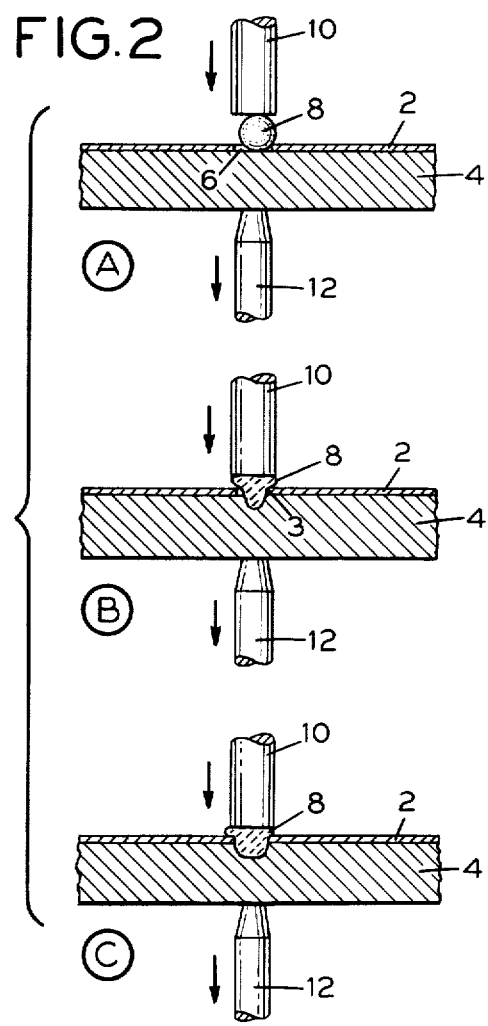
FIG. 2 is a schematic cross sectional view showing a feature of the invention in three stages designated A, B and C.

Referring to FIGS. 1 and 2 there is shown at least two layers of material, an upper layer 2 and a lower layer 4. In accordance with this invention the portion of the layers 2 and 4 to be joined are in face-to-face relationship.

The layer 2, which is to be joined to layer 4, can be made of any material weldable, non-weldable or not easily weldable. The layer 4, in accordance with this invention is made of weldable material.

The first or upper layer 2 has an opening 6 therein which is adapted to receive a ball 8 made of weldable material. The opening 6 is preferably circular in form. As can be seen, the weldable ball has a diameter which is somewhat larger than the diameter of the opening 6.

The dimensional relationship between the ball 8, the layer 2 and the opening 6 is as follows. The diameter D of the weldable ball can range from 2T to 5T where T is the thickness of the upper layer 2. Preferably the diameter is 4T.

The diameter of the aperture or hole 6 is slightly smaller than the diameter of the ball 8 and is in the range of 94–96% and preferably 95% the diameter of the ball.

After the ball 8 has been positioned as shown in FIG. 1A, the electrodes 10 and 12 are placed in contact with the top of the ball 8 and the adjacent portion of the bottom layer 4.

Upon application of electrical current and pressure in accordance with usual welding practices, the ball is deformed as shown in FIGS. 1B and 1C. As can be seen in FIG. 1C the ball 8 and the bottom layer 4 are welded together while the ball 8 has been deformed so as to overlap a portion of the upper surface of the upper layer so as to join the upper layer 2 and the lower layer 4.

One of the features of the invention is illustrated in FIGS. 2A and B and C. These figures illustrate a self-centering feature of the invention.

Thus, if as shown in FIG. 2A the ball is not centered with respect to the aperture 6 and touches the sides thereof, then upon application of electrical current and pressure, the following can happen:

(1) the contact resistance at the point of ball and aperture engagement will be high enough to preclude current shunting, or (2) the point 3 of the side of the aperture engaging the ball will be burned away so that the ball is, in effect, again centered as illustrated in FIG. 2B.

As shown in FIG. 2C after the ball has become centered it will be welded to bottom layer 4 and overlap a portion of the upper layer 2 to thereby join the upper layer 2 and the lower layer 4 as in the case of FIG. 1.

One of the features of this invention is the fact that by reason of the procedure herein followed, the electrical current applied by the electrodes is directed almost in its entirety to welding the ball to the bottom plate and there is virtually no current shunting to other points of weldment. As indicated above, where the ball is off-center it is self-centering as described in reference to FIGS. 2A, B and C. The self-centering aspect illustrated in FIGS. 2A, B and C of course prevents electrical current shunting to the adjacent portions of the upper layer if the upper layer is made of material capable of conducting electrical current.

Figure 3:
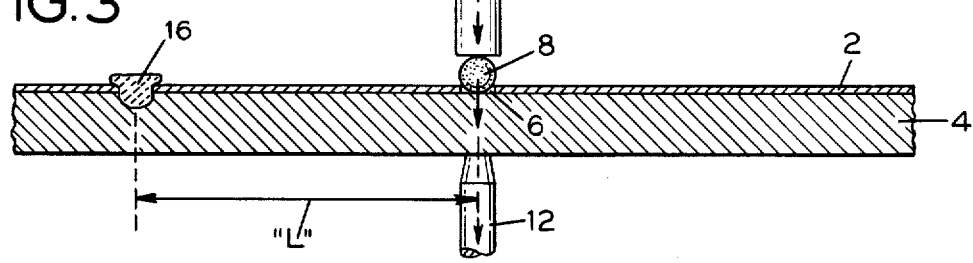
FIG. 3 is a schematic cross sectional view illustrating adjacent welds in accordance with this invention.
Figure 4:
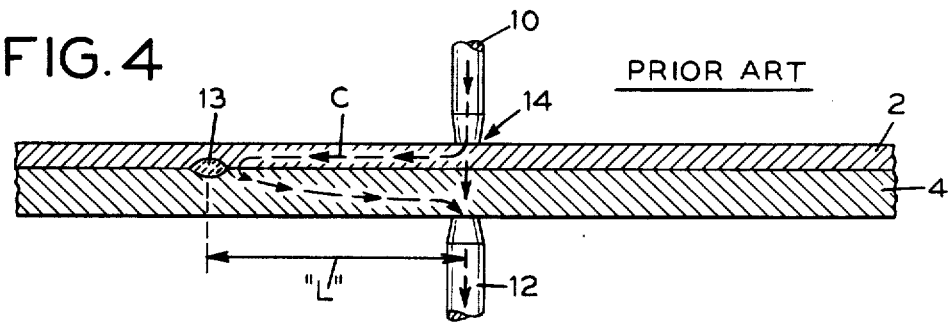
FIG. 4 is a schematic cross sectional view illustrating a welding method in accordance with the prior art.

FIGS. 3 and 4 illustrate and compare the present invention to prior art spot welding techniques.

In the prior art spot welding technique (FIG. 4) where the upper layer 2 is made of current conducting material there is a current path formed between the upper and lower electrodes 10 and 12 whereby current C is shunted through the adjacent weld 13. Such a division of current can result in a poor weld at the new weld point 14 due to lack of sufficient electrical current. Alternatively, it may be necessary to increase the distance "L" between successive welds so as to reduce such electrical current division. However, in some applications this distance prevents adequate joining of the upper and lower layers. Another alternative would be to increase the amount of electrical current passing through the electrodes but this again can produce ineffective welds due to the current path of previously made welds and the contact resistance at the point of the new weld.

In the practice of the present invention, as shown in FIG. 3, the electrical current goes directly from electrode 10 through the ball 8 to the electrode 12. The distance "L" can be whatever is necessary to obtain a strong bond between layers 2 and 4 since current will not be shunted to the adjacent weld 16.

EXAMPLE

The upper layer was 0.028 inches thick and made of C1095 spring steel hardened to a Rockwell hardness of C-50, which cannot be welded using conventional welding techniques. The lower layer was 0.375 inches thick and made of cold rolled steel C1018.

The upper layer has a circular hole having a diameter of 0.120 inches. A ball having a diameter of 0.125 inches and made of C1018 steel was placed in the hole. Upper and lower electrodes were placed in contact with the top of the ball and the adjacent bottom surface of the lower layer.

At the end of the welding period the upper and lower layers were welded together.

Successive adjacent welds were made where the distance "L" between the welds was ¾ inches. There was no apparent loss of current to previously made adjacent welds since completely satisfactory new welds were formed without increasing the amount of electrical current for each weld and without increasing the time or pressure for each weld.

What is claimed:

1. A method of joining a first and second layer of material at least said second layer being made of weldable material comprising:
   (a) placing said first and second layers in face-to-face relationship;
   (b) selecting a ball of weldable material having a diameter in the range of 2T to 5T where T is the thickness of said first layer;
   (c) said first layer having at least one opening therein with a diameter in the range of 94% to 96% the diameter of said ball;
   (d) positioning said ball in said opening so that the ball is in contact with an adjacent surface of said second layer;
   (e) applying electrical current and pressure to said ball and said adjacent surface of said second layer in amounts sufficient to weld said ball to said second layer and to deform said ball so that said first and said second layers are joined.

2. A method as defined in claim 1 wherein a plurality of said openings are formed in said first layer.

3. A method as defined in claim 1 wherein said ball of weldable material is deformed sufficiently to overlie a portion of said upper layer adjacent said opening.

4. A method of joining a first and second layer of material at least said second layer being made of weldable material comprising:
   (a) placing said first and second layers in face-to-face relationship;
   (b) selecting a ball of weldable material having a diameter substantially greater than the thickness of said first layer;
   (c) said first layer having at least one opening therein with a diameter slightly smaller than the diameter of said ball;
   (d) positioning said ball in said opening so that said ball is in contact with the adjacent upper surface of said second layer;
   (e) applying electrical current and pressure to said adjacent surface of said second layer in amounts sufficient to weld said ball to said second surface and to deform said ball so that a portion of said ball overlies a portion of said upper layer adjacent said opening.

* * * * *